United States Patent [19]

Sue et al.

[11] Patent Number: 4,549,219
[45] Date of Patent: Oct. 22, 1985

[54] IMAGE INFORMATION TRANSMISSION SYSTEM

[75] Inventors: Yasuhiko Sue; Masao Ariga, both of Yokohama; Yasuyuki Tamura, Kawasaki; Nao Nagashima, Yokohama; Ken Miyagi, Yokohama; Masaki Nakaoka, Yokohama; Masashi Suda, Iruma, all of Japan

[73] Assignee: Canon Kabushiki Kaisha, Tokyo, Japan

[21] Appl. No.: 433,043

[22] Filed: Oct. 6, 1982

[30] Foreign Application Priority Data

Oct. 12, 1981 [JP] Japan .................................. 56-162368

[51] Int. Cl.⁴ ............................................. H04M 1/32
[52] U.S. Cl. ..................................... 358/257; 358/280; 358/286; 358/293; 340/825.05; 455/612
[58] Field of Search ................ 358/257, 286, 256, 285, 358/293, 294, 296, 280; 340/825.05, 825.06; 455/601, 612

[56] References Cited

U.S. PATENT DOCUMENTS

| | | | |
|---|---|---|---|
| 4,234,970 | 11/1980 | Beasley et al. | 455/607 |
| 4,255,741 | 3/1981 | Peterson | 340/825.05 |
| 4,268,868 | 5/1981 | Yokota et al. | 358/286 |
| 4,383,277 | 5/1983 | Kubo | 358/286 |

Primary Examiner—Edward L. Coles, Sr.
Attorney, Agent, or Firm—Fitzpatrick, Cella, Harper & Scinto

[57] ABSTRACT

An image information transmission system comprises a plurality of image information processing units for processing image information, an image information transmission line and a control information transmission line independent from the image information transmission line for transmitting control information related to the processing of the image information processing units. The control information can be transmitted even during the transmission of the image information.

14 Claims, 9 Drawing Figures

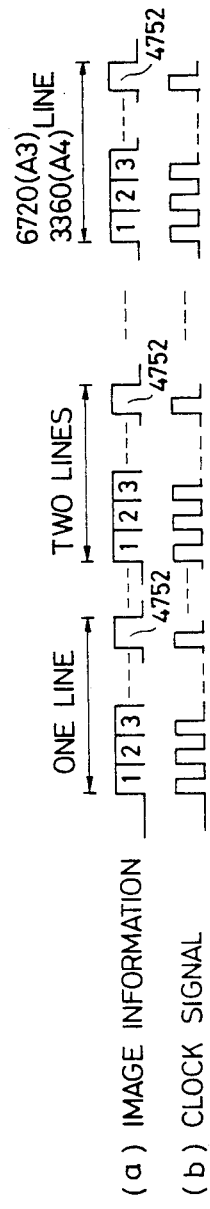
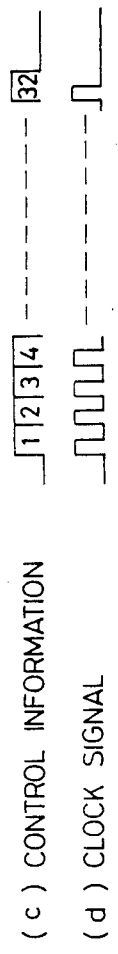
FIG. 3
(a) IMAGE INFORMATION
(b) CLOCK SIGNAL
FIG. 4
(c) CONTROL INFORMATION
(d) CLOCK SIGNAL

IMAGE INFORMATION TRANSMISSION SYSTEM

BACKGROUND OF THE INVENTION

1. Field of the Invention

The present invention relates to an image information transmission system for transmitting image information among a plurality of image information processing units.

2. Description of the Prior Art

Typical prior art image information transmission systems include a loop network system in which a plurality of terminals each having image information forming and recording functions are connected in a loop by a transmission line such as an optical fiber and the image information is transmitted from one of the terminals to other one or more of the terminals and a star network system in which a master station which can distribute an input signal to a plurality of terminals is provided and the output signal from the master station is transmitted to the plurality of terminals. These systems need the transmission of control information called a protocol including a destination terminal address, the number of images to be transmitted and the size of image, from a source terminal of the image information. The transmission of information on the status of the terminal such as a ready for reception signal and an end of reception signal, from the destination terminal to the source terminal is also required.

Such information other than the image information is usually transmitted through the same transmission line as that for the image information, before or after the transmission of the image information.

Control information for indicating an abnormal condition of the unit such as a signal to indicate a jam of a record paper may be generated during the transmission of the image information.

However, if the transmission line is being used to transmit the image information, the control information cannot be transmitted to the source terminal of the image information. As a nature of the image information transmission, a large quantity of information is continuously transmitted through the transmission line. As a result, a long time is required from the occurrence of the abnormal condition during the transmission of the image information to a time point permitted to inform the abnormal condition to the source terminal.

It may be possible to switch the transmission line to the transmission of the control information upon the occurrence of the abnormal condition during the transmission of the image information, but the transmission of the image information to normal terminals is interrupted by the transmission of the control information.

SUMMARY OF THE INVENTION

It is an object of the present invention to provide an image information transmission system which provides a smooth flow of image information.

It is another object of the present invention to provide an image information transmission system which permits transmission of control information during transmission of image information.

It is another object of the present invention to provide an image information transmission system which stores an abnormal condition of the system as status information when such an abnormal condition occurs during the transmission of image information.

It is another object of the present invention to provide an image information transmission system which permits the transmission of control information indicating an abnormal condition of the system when such an abnormal condition occurs during the transmission of image information.

It is another object of the present invention to provide an image information transmission system which displays an abnormal condition of the system when such an abnormal condition occurs.

It is another object of the present invention to provide an image information transmission system which permits succession of an operation of an abnormal terminal to a normal terminal when an abnormal condition occurs during the transmission of image information.

It is another object of the present invention to provide an image information transmission system which can operate a terminal having an image information forming unit and a recording unit as an apparatus independent from the image information transmission system (local use).

It is another object of the present invention to provide an image information transmission system which can operate terminals as apparatus independent from the image information transmission system when image information is not transmitted.

It is another object of the present invention to provide an image information transmission system which permits the transmission of control information among terminals irrespctive of the presence or absence of the transmission of image information even if one or more terminals are operating as independent apparatus.

It is another object of the present invention to provide an image information transmission system which permits the transmission of image information among terminals even if one or more terminals are operating as independent apparatus.

BRIEF DESCRIPTION OF THE DRAWINGS

FIG. 3 shows a configuration of image information, FIG. 4 shows a configuration of control information.

DETAILED DESCRIPTION OF THE PREFERRED EMBODIMENT

Figure 1A:
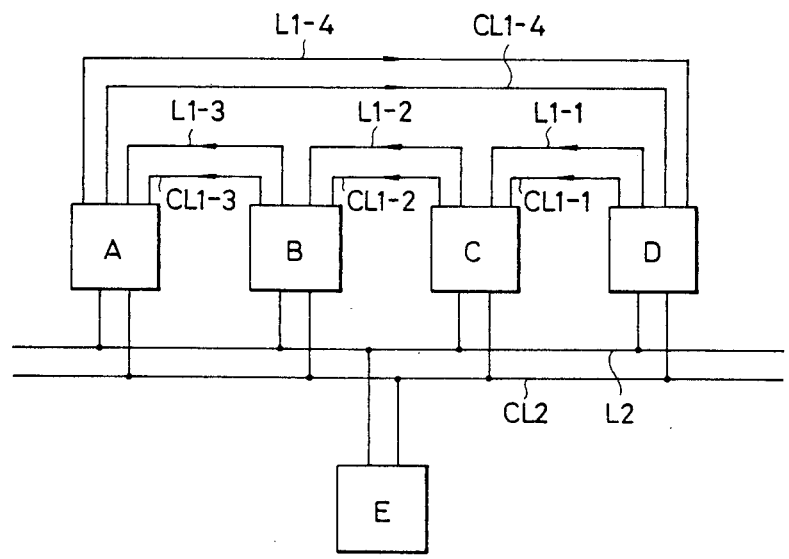
FIG. 1A shows a configuration of an image information transmission system of the present invention.
Figure 1B:
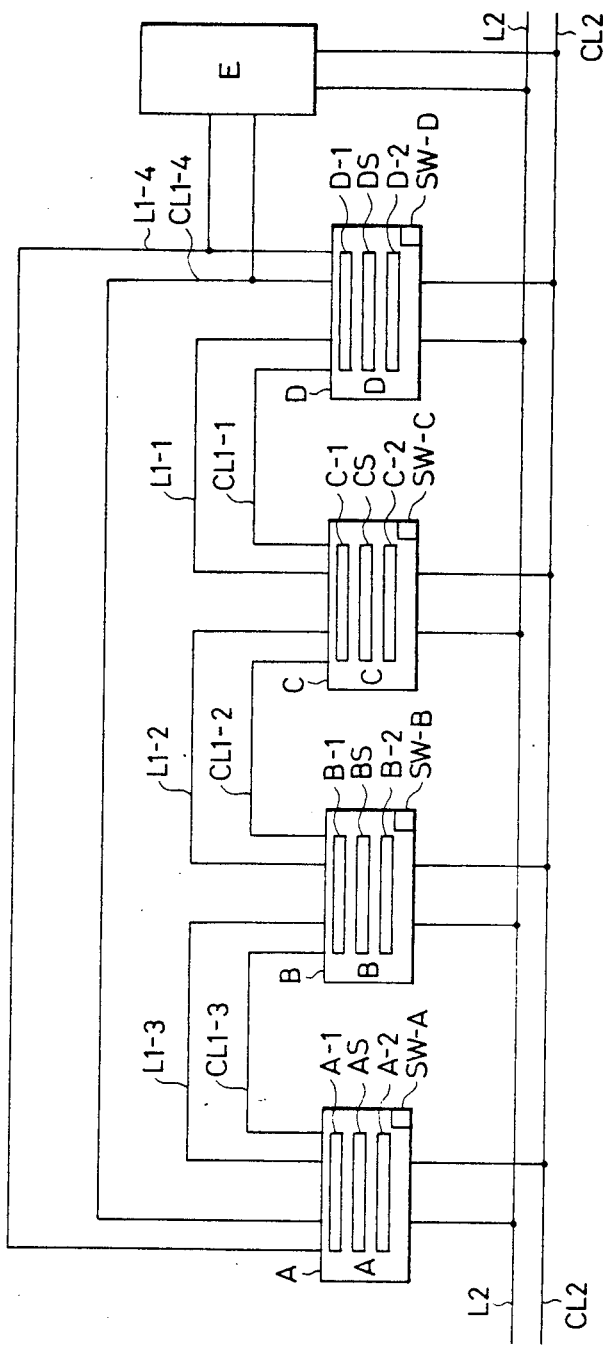
FIG. 1B shows a detail of Fig. 1A.

FIGS. 1A and 1B show a configuration of the image information transmission system of the present invention. FIG. 1B is a detailed diagram of FIG. 1A.

Symbols A, B, C and D denote terminals each having a reader (image information forming unit) for reading an original bearing information to be read, a printer (recording unit) for recording image information and a control unit. For the purpose of simplification, a system having four such terminals is shown, although the number of terminals is not limited thereto.

Terminals A, B, C and D are connected to control information transmission lines, clock lines and image information transmission lines. L1-1 denotes a control information transmission line between the terminals C and D, CL1-1 denotes a clock line for synchronizing the transmission of the control information between the terminals C and D, L1-2 denotes a control information transmission line between the terminals B and C, CL1-2 denotes a clock line for synchronizing the transmission of the control information between the terminals B and C, L1-3 denotes a control information transmission line between the terminals A and B, CL1-3 denotes a clock line for synchronizing the transmission of the control information between the terminals A and B, L1-4 denotes a control information transmission line between the terminals A and D and CL1-4 denotes a clock line for synchronizing the transmission of the control information between the terminals A and D.

L2 denotes an image information transmission line and CL2 denotes a clock line for synchronizing the terminals A-D which are connected in parallel to the lines L2 and CL2.

A-1, B-1, C-1 and D-1 denote pulse generators for generating clock pulses for synchronizing the terminals A-D when the control information is transmitted. A-2, B-2, C-2 and D-2 denote pulse generators for generating clock pulses for synchronizing the terminals A-D when the image information is transmitted. The transmission lines may be optical fiber cables. In that case, opto-electrical converters and electro-optical converters to be described later are contained in the terminals.

E denotes an image information recording unit (for example, disc memory) which is connected to the image information transmission line L2, the control information transmission line L1 and the clock lines CL1 and CL2. During the transmission of the image information, the image information is sent out to the image information transmission line L2, and the image information on the image transmission line L2 is sequentially recorded in the image information recording unit E. The image information in the image information recording unit E is read out by a command in the control information and sent out to the image information transmission line L2.

SW-A, SW-B, SW-C and SW-D denote a start of transmission switch and key switches to be actuated by an operator to specify a destination terminal, the number of times of transmission, the size of an original, the content of processing, a local use and a secret document. In the local use mode, a specified terminal is used as an apparatus having image information forming and recording functions independent from the system.

AS, BS, CS and DS denote displays for displaying status information such as an abnormal condition of the terminal to the operator.

Figure 2:
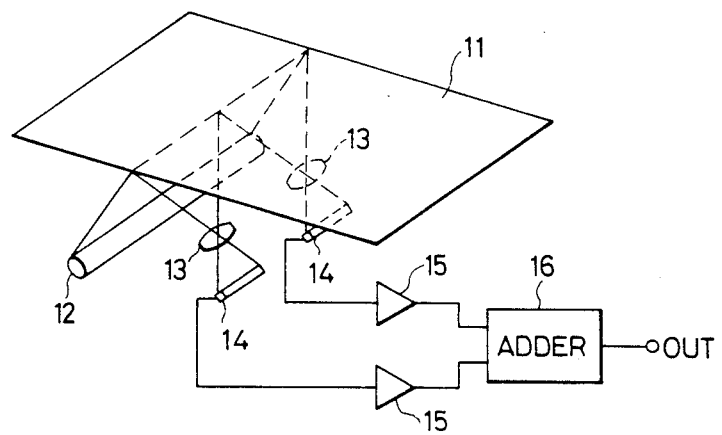
FIG. 2 shows a configuration of an image information forming unit in a terminal.

FIG. 2 shows one embodiment of the image information forming unit. An original 11 bearing information to be read thereon is illuminated by a light source 12 such as a fluorescent lamp. A light reflected by the original 11 is focused by a lens 13 onto a line image sensor 14 such as a CCD. The present unit reads one line of image on the original in a direction of main scan at a rate of 16 picture cells/mm while sub-scanning laterally for a size A4 original and longitudinally for a size B4 original. A line density is 16 lines/mm so that a total number of lines is 6702 for the size A3 original and 3360 for the size A4 original. The number of picture cells in the direction of main scan is 4752 bits, which are read by two image sensors. The image information read by the image sensors 14 is shaped by amplifiers 15, outputs of which are then applied to an adder 16, which combines the two-channel input image information to one line of one-channel image information, which is then taken out of an output terminal OUT.

The imge information supplied from the image information forming unit is shown in FIG. 3. The pulse generators A-2, B-2, C-2 and D-2 of FIG. 1B each generates a clock signal (b) which rises at a rising edge of the image information (a) and falls at a stable point in a middle of the image information (a).

When the image sensors 14 of FIG. 2 are driven by the clock pulses of 7 MHZ, the size A4 original can be read in 1.14 seconds and the size A3 original can be read in 2.28 seconds.

The control unit is now explained. FIG. 4 shows the control information (c) and the transmission clock signal (d). The control information is produced as packet information of 32-bit per packet. Like the clock signal for the image information, the clock signal (d) rises at a rising edge of the control information (c) and falls at a stable point in a middle of the control information (c). The clock signals generated in synchronism with the image information and the control information are transmitted through the clock lines CL2, CL1-1, CL1-2, CL1-3 and CL1-4 of FIG. 1 to synchronize the information of the source terminal and the destination terminal.

When the transmission lines are of the same material, two pulse generators as shown in FIG. 1B are not necessary but only one terminal may be used in each terminal.

Figure 5:
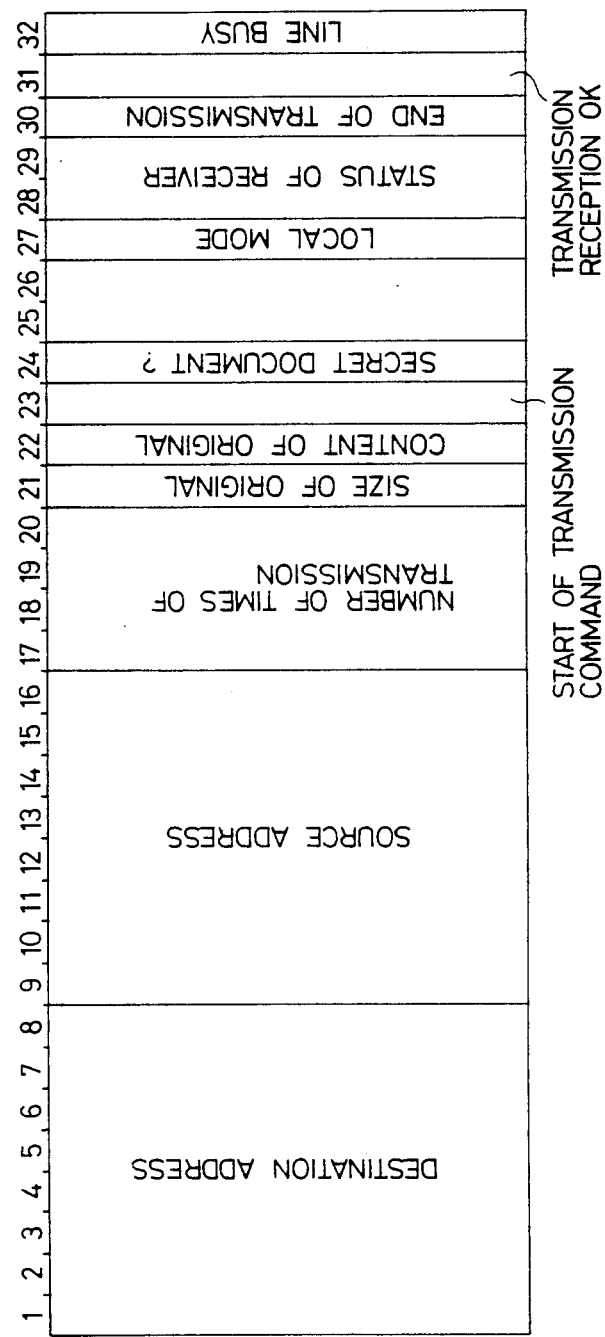
FIG. 5 shows a content of one packet of control information.

FIG. 5 shows a content of one packet of control information. First to sixteenth bits represent a destination address and a source address, each by eight bits so that up to 256 terminals can be connected twenty-first to thirty-second bits are used for the transmission of the control information for the image information transmission. Table 1 shows types and contents of the control information. Dither processing means half tone (gray level) processing for the image information.

TABLE 1

| Bit No | Type | Content |
| --- | --- | --- |
| 1–8 | Destination address | Set address by 8-bit signal |
| 9–16 | Source address | Set address by 8-bit signal |
| 17–20 | Number of times of transmission | Set number of times of transmission by 4-bit signal |
| 21 | Size of original | "1" for size A4 and "0" for size A3 |
| 22 | Content of processing | "1" for dither processing and "0" for no processing |
| 23 | Start of transmission command | "1" to command start of transmission |
| 24 | Secret document command | "1" to designate secret document and "0" for non-designation |
| 25, 26 | — | — |
| 27 | Local mode | "1" for local mode |
| 28, 29 | Status of receiver | "00" for normal, "01" jam, "10" for no paper and "11" for no toner |
| 30 | End of transmission | "1" to indicate end of transmission |
| 31 | Transmission/reception OK | "1" for transmission/reception OK |
| 32 | Line busy | "1" for control information transmission line busy |

Figure 6:
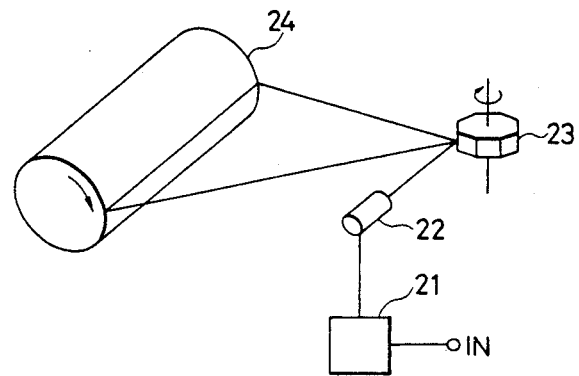
FIG. 6 shows a configuration of a recording unit in the terminal.

FIG. 6 shows a configuration of an embodiment of the image information recording unit. The image information supplied through the image information transmission line is applied to a laser driver 21 from an input terminal IN. The laser driver 21 modulates a laser generator (for example, semiconductor laser) 22 with the input signal. The light generated by the laser generator 22 is directed to a polygon mirror 23 rotating at a constant speed and deflected by the mirror 23 to primarily scan a photosensitive member 24.

An image written on the photosensitive member 24 by the laser beam is developed by developing means, not shown, and the image is transferred to a recording medium such as a paper.

Figure 7:
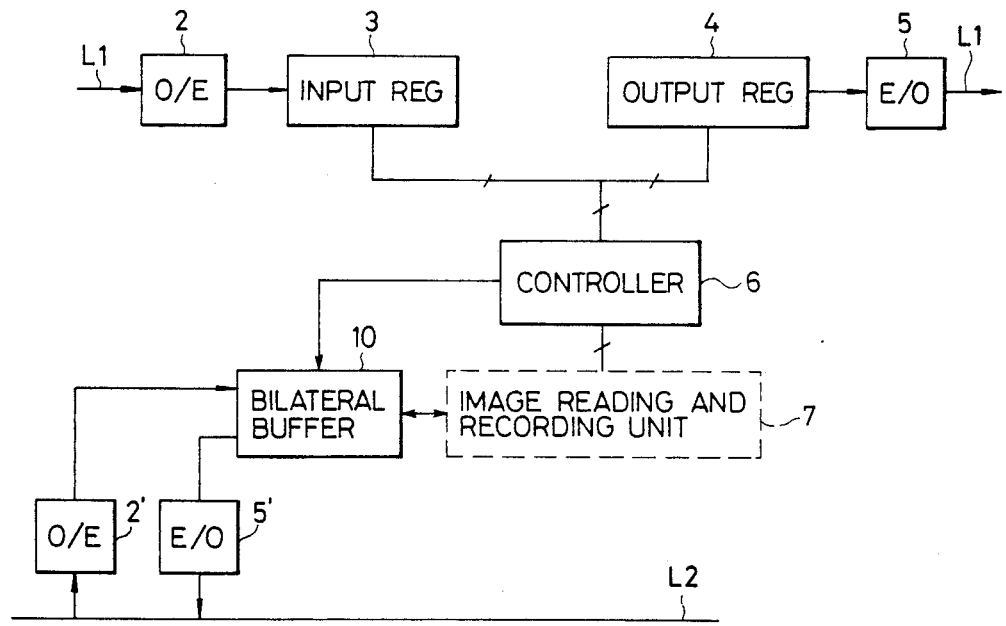
FIG. 7 shows a configuration of the terminal.

FIG. 7 shows a block diagram of an overall configuration of the terminal of the image information transmission system of the present invention. L2 denotes the image information transmission line. L1 denotes the control information transmission line such as L1-1, L1-2, L1-3 or L1-4 shown in FIG. 1B. The transmission lines are optical fibers in the present embodiment.

Numeral 2 denotes an opto-electric converter for converting a light signal supplied from the control information transmission line L1 to an electrical signal, numeral 3 denotes an input register for storing one packet of or 32 bits of control information converted to the electrical signal and supplied from the opto-electric converter 2, numeral 4 denotes an output register for storing one packet of control information to be outputted, numeral 5 denotes an electro-optical converter which converts the electrical signal of the control information supplied from the output register 4 to a light signal and supplies it to the control information transmission line L1, numeral 6 denotes a controller which controls the operation of the terminal and analyzes the control information stored in the input register 3 and supplies the control information to the output register 4, numeral 7 denotes an image reading and recording unit which includes the image information forming unit and the recording unit shown in FIG. 2 and FIG. 6, numeral 2' denotes an opto-electric converter for converting a light signal on the information transmission line L2 to an electrical signal, numeral 5' denotes an electrooptical converter which converts the output image information to a light signal and supplies it to the image information transmission line L2 and numeral 10 denotes a bilateral buffer which controls input/output operation of the image information in accordance with a command from the controller 6. The operation of those units will be described later.

Figure 8:
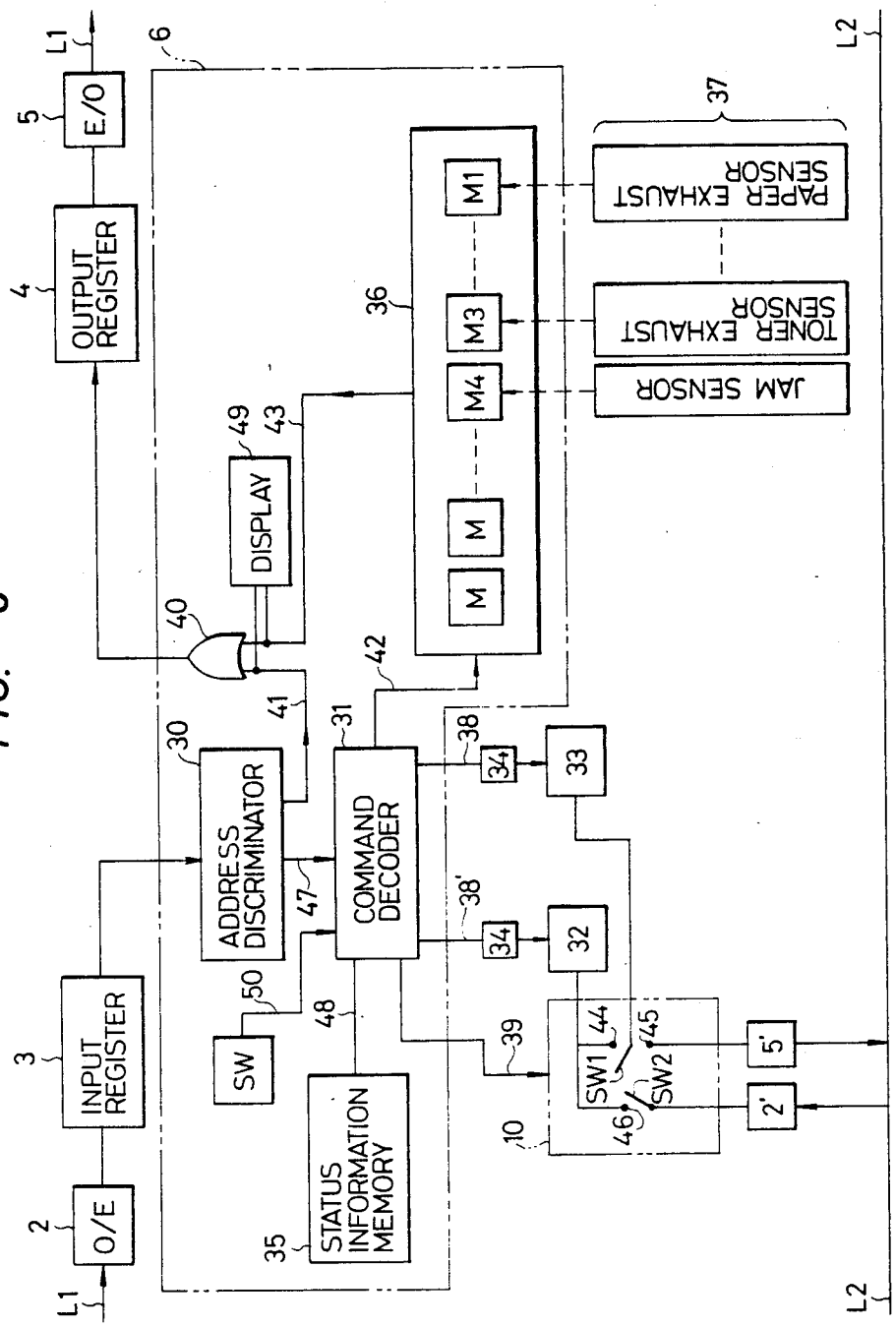
FIG. 8 shows a detail of FIG. 7.

FIG. 8 shows a detail of FIG. 7. The controller 6 of FIG. 7 includes an address discriminator 30, a command decoder 31, key switches SW, a status information memory 35, an output control information memory 36 and a display 49. In FIG. 8, the controller 6 is encircled by a chain line block. The key switch SW correspond to the switches SW-A, SW-B, SW-C and SW-D shown in FIG. 1B. Numerals 38 and 38' denote control information signal lines for controlling the recording unit 32 and the image information forming unit 33 through drivers 34. Numeral 39 denotes a control information signal line for controlling the bilateral buffer 10. A switch SW1 is selectively connected to a contact 44 or 45 to supply the image information to the image information transmission line L2 or to cause the terminal to operate as an apparatus having image information forming and recording functions independent from the system (local mode), and a switch SW2, when connected to a contact 46, supplies the image information on the image information transmission line to the recording unit. A control information signal line 41 connects the address discriminator 30 and an OR gate 40. A control information signal line 42 connects the command decoder 31 and a control information memory 36. A control information signal line 43 connects the control information memory 36 and the OR gate 40.

The status information memory 35 stores a status of the terminal in an abnormal condition through the control information signal line 48. The display 49 displays the status information AS, BS, CS and DS shown in FIG. 1B. Numeral 37 denotes sensors for detecting abnormal conditions. The control information memory 36 selects one of the memories of the control information corresponding to the detected abnormal condition. For example, when the paper is exhausted, the memory M1 is selected. The control information memory 36 sends out the corresponding control information to the control information signal line 43, which information is then supplied to the control information transmission line L1 through the OR gate 40, the output register 4 and the opto-electric converter 5. The abnormal conditions may include paper exhaust, toner exhaust and jam. When such abnormal condition is detected, it is displayed on the display 49.

The operation of the present embodiment is now explained in detail with reference to FIGS. 5, 7 and 8 and Table 1.

The control information on the control information transmission line L1 is read into the address discriminator 30 of the controller 6 through the opto-electric converter 2 and the input register 3 to discriminate the address. The address of the bits 1–16 of the control information shown in FIG. 5 and Table 1 is discriminated. When the address is not related to the terminal under consideration, it is sent out to the control information signal line 41. The control information is then supplied to the control information transmission line L1 as the light signal, through the OR gate 40, the output register 4 and the electro-optical converter 5.

If the address specifies the terminal under consideration, the control information is read into the command decoder 31 through the control information signal line 47 to discriminate the content of the control information. The command decoder 31 supplies signals to the control information signal lines 42, 38, 38', 39 and 48.

The control information transmitted through the control information signal line 42 is supplied to the output control information memory 36, which supplies the corresponding control information from the corresponding memory to the control information signal line 43. It is then supplied to the control information transmission line L1 as the light signal through the OR gate 40, the output register 4 and the electro-optical converter 5.

When one of the terminals is designated as a source terminal, that is, when an operator depresses the start of transmission switch of the key switches SW, the address of the terminal is applied to the bits 9–16 of the control information shown in FIG. 5 and Table 1, as a source terminal address. The control information is applied to the address discriminator 30 of the terminal so that it is determined that the terminal is the source terminal.

When the source terminal address of the bits 9–16 of the control information of FIG. 5 and Table 1 designates the terminal under consideration and the terminal is ready to transmit by the bit 27 (local mode) and the bits 28 and 29 (status of receiver) of the control information of FIG. 5 and Table 1, necessary bits such as the bit 21 (size of original), the bit 22 (content of processing), the bit 23 (start of transmission command) and the bit 24 (secret document) of the control information of FIG. 5 and Table 1 are set in the control information memory 36 and they are sent out one packet at a time to the control information transmission line L1 from the output register 4. When the bit 31 of the control information of FIG. 5 and Table 1 at the destination terminal becomes "1" and the source terminal receives the control information indicating the completion of the reception of the control information, the source terminal transmits the image information to the destination terminal.

The source terminal simultaneously activates the image information forming unit 33 through the control information signal line 38 and the driver 34. It also activates the bilateral buffer 10 through the control information signal line 39. That is, the switch SW1 is connected to the contact 45. The image information to be transmitted is sent out to the image information transmission line L2 through the electro-optical converter 5'.

When the transmission is to be terminated, the bit 30 of FIG. 5 and Table 1 is set to "1" to indicate the end of transmission and the image information transmission is terminated. The control information is reset.

When the address discriminator 30 and the command decoder 31 discriminate that the control information is a command to record the image information, that is, when the destination address of the bits 1-8 of the control information of FIG. 5 and Table 1 is the address to designate the terminal under consideration, the terminal receives the bits 17-20 (number of times of transmission), the bit 21 (size of original), the bit 22 (content of processing) and the bit 24 (secret document) of the control information of FIG. 5 and Table 1. It also transmits the bits 28 and 29 (status of receiver), and if the terminal is normal and the bit 30 of the control information indicating the end of transmission is sent from the source terminal and the reception is terminated, it transmits the bit 31 (transmission/reception OK), and when the bit 23 of the control information (start of transmission command) is received, it prepares for reception. That is, it activates the bilateral buffer 10 through the control information signal line 39 and connects the switch SW2 to the contact 46. It also activates the recording unit 32 through the control information signal line 38' and the driver 34. As a result, the image information on the image information transmission line L2 is recorded in the recording unit through the opto-electric converter 2.

In the local mode, the operator turns on the local mode selection in the key switches SW. The information is read into the command decoder 31 through the control information signal line 50, hence it is supplied to the control information signal lines 38, 38', 39 and 42. The control information memory 36 selects the corresponding memory through the control information signal line 42 and reads out the content thereof to the control information signal line 43, hence it is supplied to the control information transmission line L1 through the OR gate 40, the output register 4 and the electro-optical converter 5. This control information is the bit 27 in FIG. 5 and Table 1 which indicates the local mode. By informing the local mode to other terminals, the terminal under consideration operates as an independent apparatus from the system. The terminal activates the bilateral buffer 10 through the control information signal line 39, connects the switch SW1 to the contact 44 and activates the image information forming unit 33 and the recording unit 32 through the control information signal lines 38 and 38' and the driver 34. Thus, the image information from the output terminal of the image information forming unit 33 is supplied to the input terminal of the recording unit 32.

The operation when the receiving terminal assumes an abnormal condition during the transmission of the image information is now explained.

Let us assume that during the transmission of the image information by a request for the transmission of a plurality of images, the paper in the terminal is exhausted after one print operation. In this case, the receiving terminal sets the bits 28 and 29 of the control information of FIG. 5 and Table 1 to "10", which are transmitted to the source terminal through the control information transmission line. Since the control information transmission line is independent from the image information transmission line, it is possible to communicate the abnormal condition to the source terminal of the image information without interrupting the transmission of the image information to other normal terminals.

When the source terminal recognizes that the abnormal condition has occurred in the destination terminal and it cannot receive the image information, the source terminal stores the status in the status information memory 35 of the controller 6. If at least one destination terminal in the system is normal, the source terminal continues to transmit the image information.

On the other hand, when papers are supplemented in the abnormal terminal and the terminal is ready to operate normally, the terminal sets the bits 28 and 29 of the control information of FIG. 5 and Table 1 to "00" to inform the ready status to the source terminal of the image information. When the source terminal recognizes this control information, it resumes the transmission of the image information to that terminal.

Even if one or more of the terminals in the transmission system are operating as the independent apparatus, the image information can be transmitted among other terminals, and in this case it is possible to transmit the control information irrespective of the transmission or non-transmission of the image information.

When the abnormal condition occurs during the transmission of the image information, the control information for informing it to the terminal located near the point of the occurrence of the abnormal condition is transmitted through the control information transmission line which is independent from the image information transmission line. Accordingly, the reception of the image information continuously transmitted from the source terminal can be succeeded by the normal terminals.

As described hereinabove, according to the present invention, the control information can be transmitted during the transmission of the image information. Accordingly, even if the abnormal condition occurs in the terminal during the transmission of the image information, the abnormal condition can be informed to other terminals without interrupting the transmission of the image information.

Consequently, the flow of information in the image information transmission system is smoothened and effective information transmission is attained.

What we claim is:

1. An image information transmission system comprising:
a plurality of image information processing means for processing image information;
an image information transmission line for transmitting said image information among any of said plurality of image information processing means; and
a control information transmission line separate from said image information transmission line, for transmitting control information among any of said plurality of image information processing means, wherein said control information is related to the image information processing by said image information processing means, and wherein each of said image information processing means is connected in parallel with each of the other said image information processing means with respect to said image information transmission line.

2. An image information transmission system according to claim 1, wherein said image information processing means are series-connected in a closed loop by said control information transmission line.

3. An image information transmission system according to claim 1, wherein said image information processing means each include image reading means for forming the image information from an original bearing information to be read.

4. An image information transmission system according to claim 3, wherein said image information reading means each include light source means for illuminating said original, lens means for focusing light from said original and image sensor means for forming the image information from the light of said lens means.

5. An image information transmission system according to claim 1, wherein said image information processing means each include image recording means for recording the image on the basis of the image information.

6. An image information transmission system according to claim 5, wherein said image recording means each include laser beam generating means for generating a modulated light in response to the input image information, deflection means for deflecting the light from said laser beam generating means and photosensitive means for sensing the light from said deflection means.

7. An image information transmission system according to claim 1, wherein said control information transmission line is an optical transmission line.

8. An image information transmission system according to claim 1, wherein said image information transmission line is an optical transmission line.

9. An image information transmission system according to claim 1, wherein said image information processing means can transmit the control information by means of said control information transmission line even during the transmission of the image information by means of said image information transmission line.

10. An image information transmission system according to claim 1, wherein the control information is transmitted by said control information transmission line in the form of a packet of a predetermined bit length.

11. An image information transmission system according to claim 1, wherein the control information includes data indicating an abnormality in said image information processing means.

12. An image information transmission system according to claim 11, wherein each of said image information processing means includes display means functioning based on said indication data.

13. An image information transmission system according to claim 1, further comprising memory means connected to said image information transmission line for storing the image information.

14. An image information transmission system according to claim 1, wherein said image information transmission line and said control information transmission line are different from each other in the form of the transmission line.

* * * * *

UNITED STATES PATENT AND TRADEMARK OFFICE
CERTIFICATE OF CORRECTION

PATENT NO. : 4,549,219

DATED : October 22, 1985

INVENTOR(S) : YASUHIKO SUE, ET AL.

It is certified that error appears in the above-identified patent and that said Letters Patent is hereby corrected as shown below:

Col. 4, line 6, change "imge" to --image--.

Col. 4, line 19, change "32-bit" to --32 bits--.

Col. 4, line 35, change "connected twenty-first" to --connected. Twenty-first--.

Col. 5, line 56, change "correspond" to --corresponds--.

Col. 7, line 66, change "the local mode to other terminals," to --the other terminals that it is in the local mode,--.

Col. 8, line 20, change "from the image" to --of the image--.

Col. 8, lines 21-2, change "communi-/cate the abnormal" to --communi-/cate knowledge of the abnormal--.

Col. 8, line 42, change "as the independent" to --as independent--.

Col. 8, line 52, change "independent from" to --independent of--.

Col. 8, line 55, change "succeeded" to --carried out successfully--.

UNITED STATES PATENT AND TRADEMARK OFFICE
CERTIFICATE OF CORRECTION

PATENT NO. : 4,549,219

DATED : October 22, 1985

INVENTOR(S) : YASUHIKO SUE, ET AL.

It is certified that error appears in the above-identified patent and that said Letters Patent is hereby corrected as shown below:

Col. 8, lines 62-3, change "the abnormal condition can be informed to other termals without" to --the other terminals can be informed of abnormal condition without--.

Signed and Sealed this

Eighteenth Day of November, 1986

*Attest:*

DONALD J. QUIGG

*Attesting Officer*  *Commissioner of Patents and Trademarks*